(12) United States Patent
Kakihara et al.

(10) Patent No.: US 8,179,001 B2
(45) Date of Patent: May 15, 2012

(54) LINEAR MOTOR ARMATURE AND LINEAR MOTOR

(75) Inventors: Masanobu Kakihara, Kitakyushu (JP);
Toru Shikayama, Kitakyushu (JP);
Motomichi Ohto, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 223 days.

(21) Appl. No.: 12/813,460

(22) Filed: Jun. 10, 2010

(65) Prior Publication Data
US 2010/0320847 A1 Dec. 23, 2010

(30) Foreign Application Priority Data

Jun. 19, 2009 (JP) ................................. 2009-146948

(51) Int. Cl.
*H02K 41/02* (2006.01)

(52) U.S. Cl. ................ 310/12.02; 310/12.25; 310/12.26

(58) Field of Classification Search ............... 310/12.02, 310/12.15, 12.21, 12.24–12.27, 12.31, 12.32
See application file for complete search history.

(56) References Cited

U.S. PATENT DOCUMENTS 6,407,471 B1 * 6/2002 Miyamoto et al. ......... 310/12.06
6,433,446 B1 * 8/2002 Sedgewick et al. ........ 310/12.21
7,582,991 B2 * 9/2009 Sugita et al. ............... 310/12.24
2010/0320847 A1 * 12/2010 Kakihara et al. ........... 310/12.02

FOREIGN PATENT DOCUMENTS

JP 11-178310 7/1999
JP 2003-143829 5/2003

* cited by examiner

*Primary Examiner* — Dang Le
(74) *Attorney, Agent, or Firm* — Ditthavong Mori & Steiner, P.C.

(57) ABSTRACT

A linear motor armature includes a plurality of armature core blocks that are linearly connected to each other, each armature core block being formed of a stack of a plurality of armature cores that are substantially I-shaped, each armature core block including teeth portions around which armature coils are wound, the teeth portions being provided in two end portions of the armature core block in a longitudinal direction of the armature core block, and a step portion extending in a direction perpendicular to the longitudinal direction of the armature core block, the step portion being provided at a center of the armature core block and having a width larger than a width of the teeth portions, wherein an attachment hole for fixing each of the plurality of armature core blocks to an external armature attachment plate is formed in each of two side portions of the step portion.

5 Claims, 4 Drawing Sheets

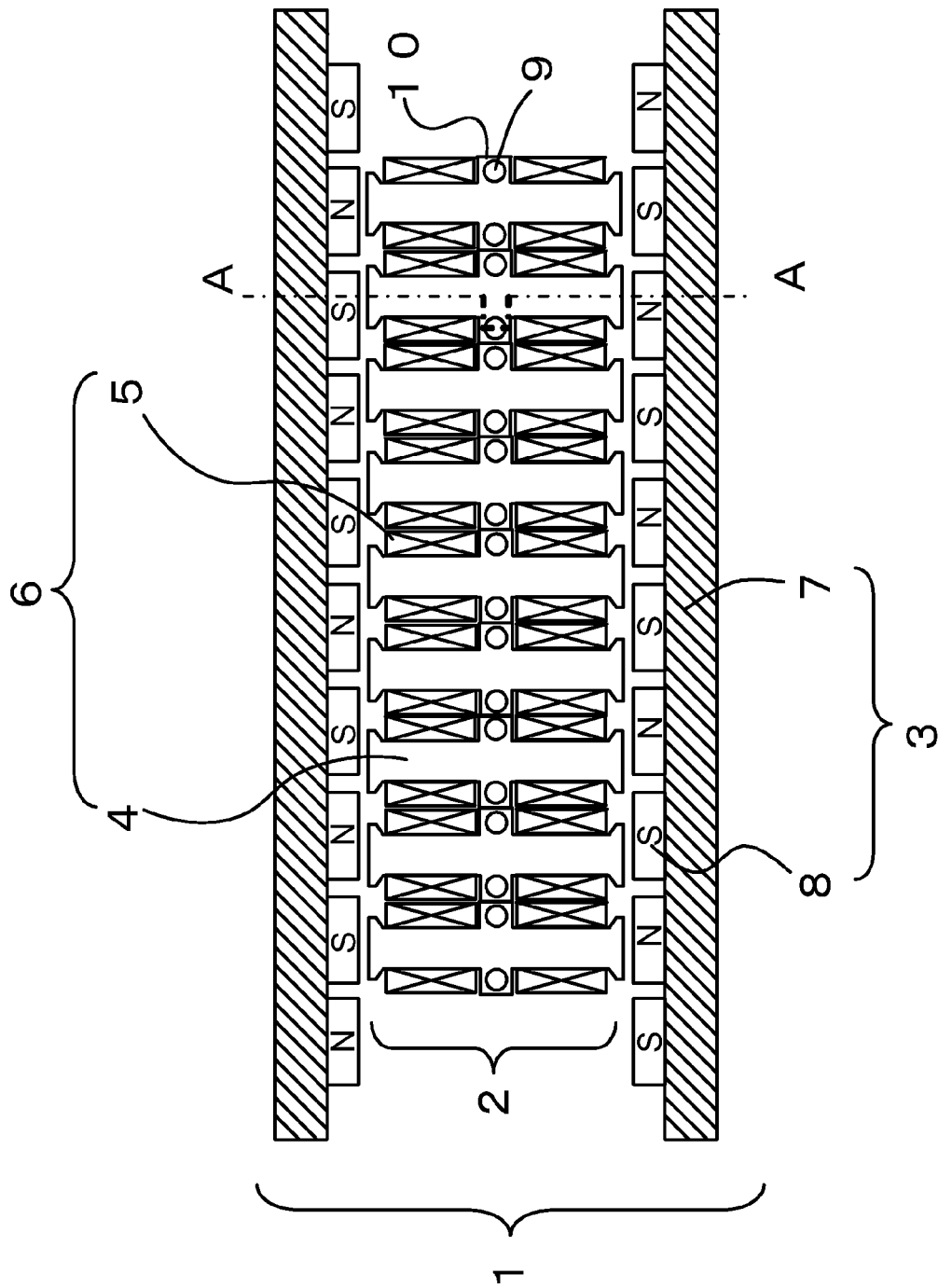

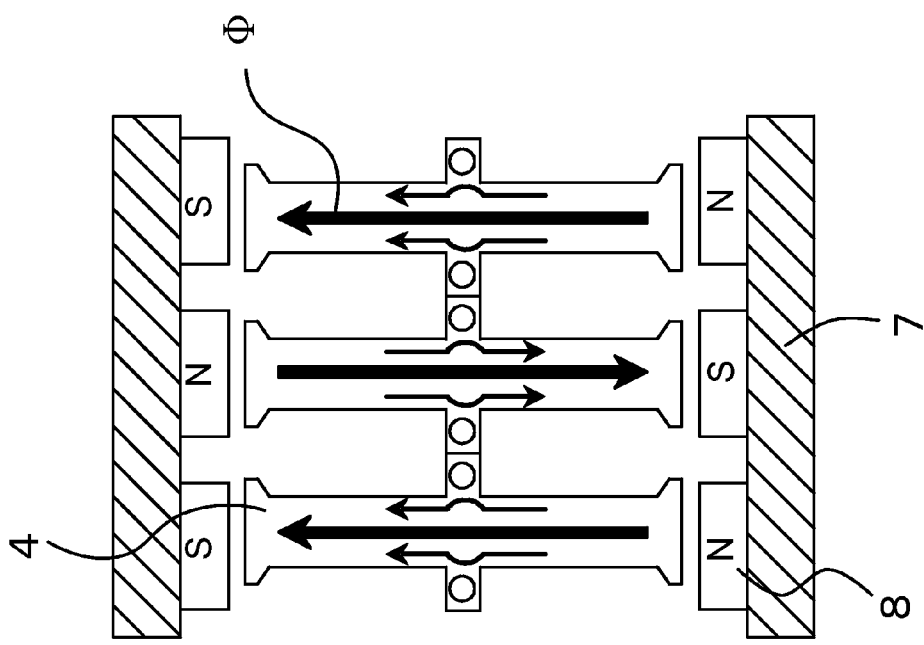
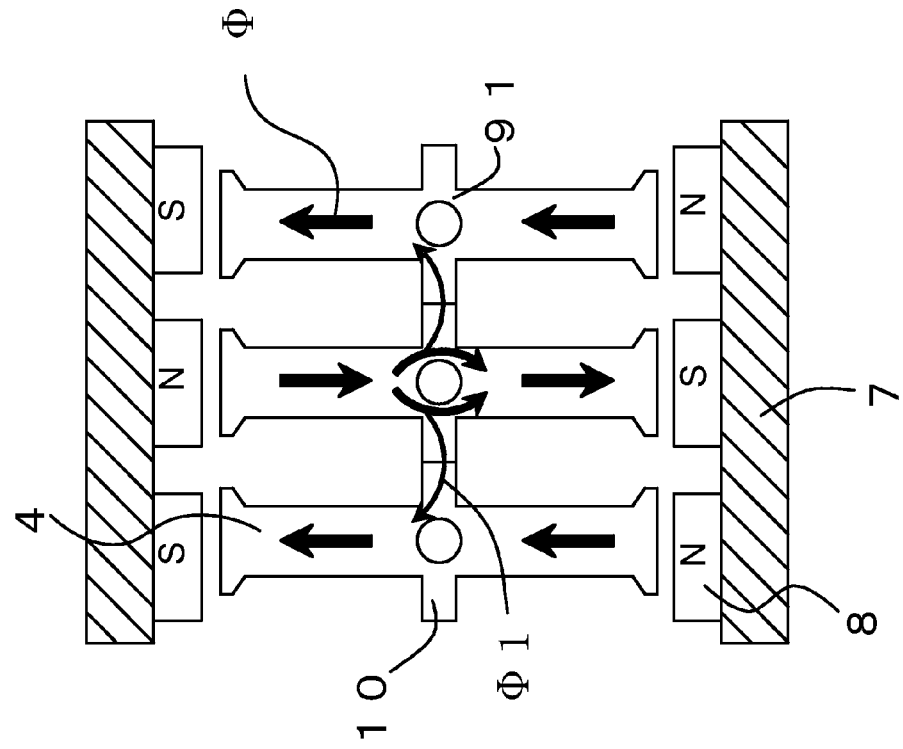

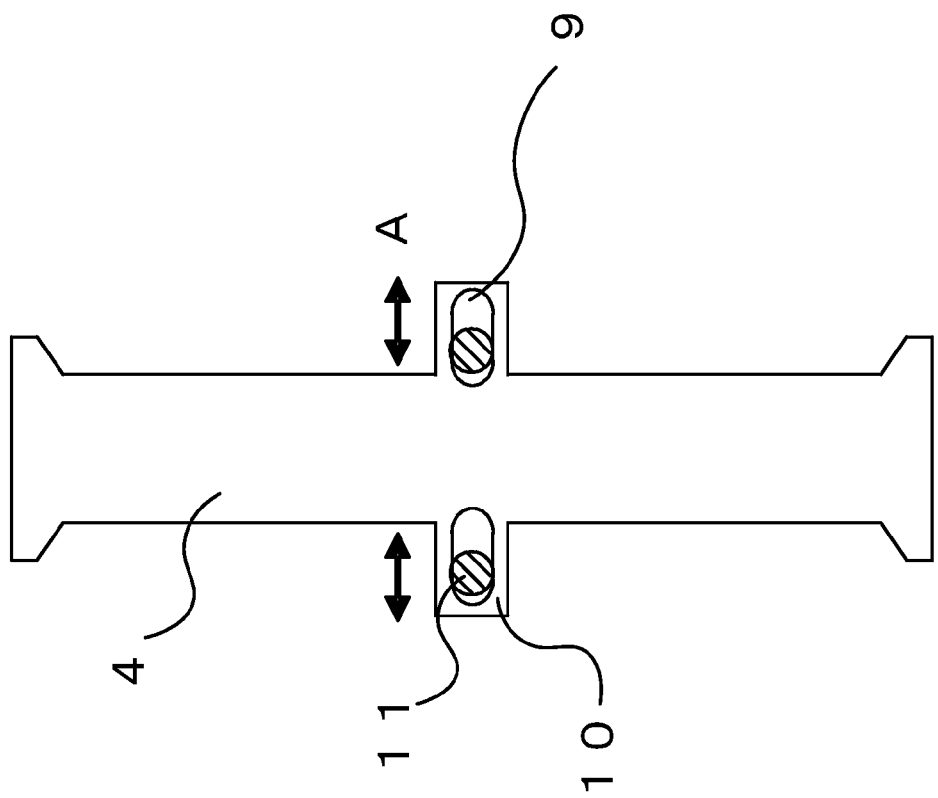

LINEAR MOTOR ARMATURE AND LINEAR MOTOR

CROSS-REFERENCE TO RELATED APPLICATION

The present application is related to Japanese Patent applications no. 2009-146948, filed Jun. 19, 2009. The contents of these applications are incorporated herein by reference in their entirety.

DESCRIPTION OF THE RELATED ART

The present invention relates to a linear motor armature and a linear motor.

A linear motor armature and a linear motor are used, for example, for moving a table in a semiconductor manufacturing apparatus or a machine tool. In this technical field, Japanese Unexamined Patent Application Publication No. 11-178310 laid open on Jul. 2, 1999 (Japanese Patent No. 3944799) describes a double-sided linear motor having a structure in which a field permanent magnet is sandwiched between two armature units from both sides or in which an armature is sandwiched between two field permanent magnets from both sides. With such a structure, so-called attractive forces are cancelled out so that a linear motor having a high-thrust density, i.e., a small size and high thrust, is provided.

In particular, the armature of the double-sided linear motor includes a plurality of armature core blocks that are linearly connected to each other. Each armature core block includes a stack of a plurality of substantially I-shaped armature cores, and armature coils are wound around teeth portions that are formed at two end portions of the armature core block in the longitudinal direction of the armature core block.

When assembling the armature, each armature core block is attached to an armature attachment plate by inserting a bolt into an attachment hole that is formed at the center of the armature core block and by screwing the bolt into a threaded portion of the armature attachment plate. The armature core blocks and the armature attachment plate are joined to each other so as to constitute a mover.

SUMMARY OF THE INVENTION

According to a first aspect of the present invention, a linear motor armature includes a plurality of armature core blocks that are linearly connected to each other, each armature core block being formed of a stack of a plurality of armature cores that are substantially I-shaped, each armature core block including teeth portions around which armature coils are wound, the teeth portions being provided in two end portions of the armature core block in a longitudinal direction of the armature core block, and a step portion extending in a direction perpendicular to the longitudinal direction of the armature core block, the step portion being provided at a center of the armature core block and having a width larger than a width of the teeth portions, wherein an attachment hole for fixing each of the plurality of armature core blocks to an external armature attachment plate is formed in each of two side portions of the step portion.

BRIEF DESCRIPTION OF THE DRAWINGS

The present invention will be described in further detail with reference to the accompanying drawings wherein:

FIG. 1 is a sectional plan view of a linear motor according to a first embodiment of the present invention;

FIG. 2A is a sectional plan view illustrating the path of magnetic flux in the linear motor of FIG. 1;

FIG. 2B is a sectional plan view illustrating the path of magnetic flux in a linear motor of a comparative example;

FIG. 4 is a sectional plan view of an armature core block according to a third embodiment of the present invention.

DETAILED DESCRIPTION OF THE EMBODIMENTS

Figure 3B:
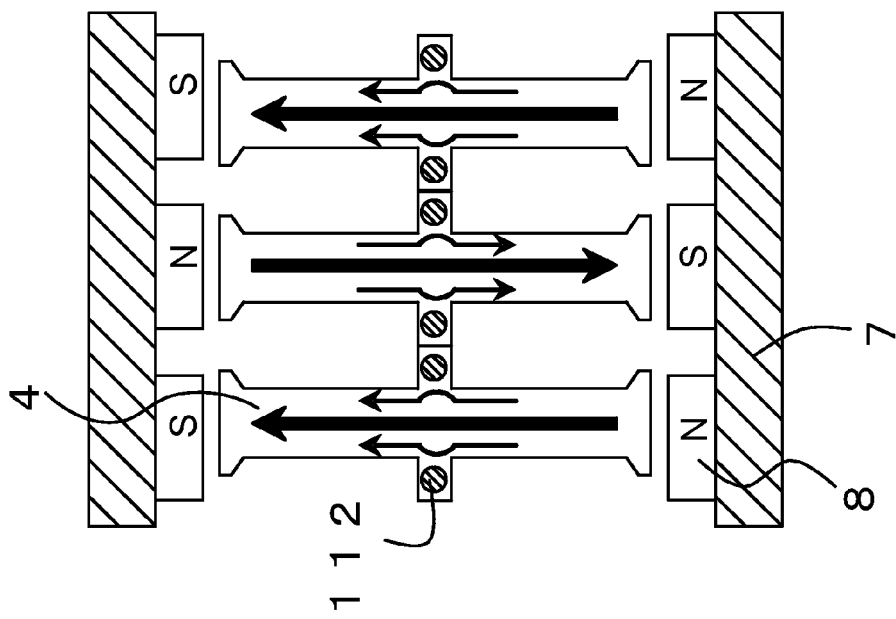
FIG. 3B is a sectional plan view of a linear motor according to a second embodiment of the present invention, which schematically illustrates the path of magnetic flux when non-magnetic bolts are used as fastening members for integrally connecting the armature core blocks to the armature attachment plate.

Hereinafter, embodiments of the present invention will be described with reference to the drawings.
First Embodiment FIG. 1 is a sectional plan view of a linear motor 1 according to a first embodiment of the present invention.

Referring to FIG. 1, the linear motor 1 includes an armature 2 and a field magnet 3 that faces the armature 2 with a gap therebetween. The armature 2 includes a plurality of armature blocks 6 that are connected to each other in a direction in which the armature 2 moves. Each armature block 6 includes an armature core block 4 that is substantially I-shaped and armature coils 5 that are wound around teeth provided in two end portions of the armature core block 4 in the longitudinal direction of the armature core block 4. The field magnet 3 includes a field magnet yoke 7 and a plurality of permanent magnets 8 that are arranged on the field magnet yoke 7 at a regular pitch in such a manner that adjacent permanent magnets 8 have alternate polarities. The permanent magnets 8 that face each other with an armature therebetween have different polarities, so that a through-flux structure, in which magnetic flux from the permanent magnet 8 passes straightly through the armature core block 4, is provided. A step portion 10 is provided at the center of each armature core block 4 so as to extend in a direction perpendicular to the longitudinal direction of the armature core block 4. The step portion 10 has a width larger than that of the teeth portions, and two attachment holes 9 are formed in the side portions thereof.

Next, the principle behind improvement of thrust of a linear motor will be described.

FIG. 2A is a sectional plan view illustrating the path of magnetic flux in the linear motor in FIG. 1, and FIG. 2B is a sectional plan view illustrating the path of magnetic flux in a linear motor of a comparative example.

As illustrated in FIG. 2B, in a linear motor of the comparative example, if the thickness (dimension in the longitudinal direction of the armature core block) of the step portion 10, which is provided at the center of the armature core block 4, is reduced so as to increase the cross-sectional areas of slots, the width of the path of magnetic flux in an attachment hole periphery 91 of the armature core block is reduced and hence the magnetic resistance increases. Therefore, main magnetic flux $\Phi$ decreases, and magnetic loading is reduced. Moreover, because the attachment hole is formed at the center of the armature core block, magnetic flux leaks to adjacent armature core blocks, and thrust decreases due to leakage flux Φ1. On the other hand, as illustrated in FIG. 2A, large magnetic flux can pass through the linear motor of the first embodiment, because the attachment hole is not formed at the center of the armature core block and hence the path of magnetic flux has a large width.

Thus, the thickness of the step portion 10 can be reduced without reducing the magnetic loading, so that the cross-sectional areas of coil slots can be increased and electric loading can be improved. Because the attachment holes 9 are formed in the step portion 10, leakage flux between adjacent armature core blocks is interrupted, so that reduction in thrust can be prevented.

When the thickness of the step portion is reduced in order to increase the cross-sectional areas of coil slots, it is necessary that a bolt used as a fastening member have a small diameter. Nevertheless, the strength is secured because each armature core block is fixed to an armature attachment plate at two positions.

Second Embodiment

Figure 3A:
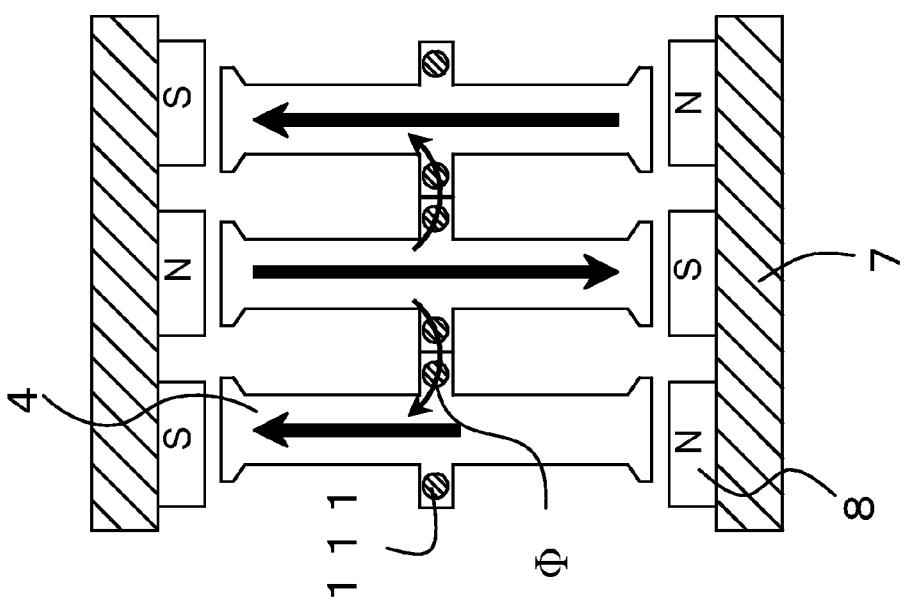
FIG. 3A is a sectional plan view of a linear motor according to a second embodiment of the present invention, which schematically illustrates the path of magnetic flux when magnetic bolts are used as fastening members for integrally connecting armature core blocks to an armature attachment plate.

FIG. 3A is a sectional plan view of a linear motor according to a second embodiment of the present invention, which schematically illustrates the path of magnetic flux when magnetic bolts are used as fastening members for integrally connecting the armature core blocks to the armature attachment plate. FIG. 3B is a sectional plan view of a linear motor according to a second embodiment of the present invention, which schematically illustrates the path of magnetic flux when non-magnetic bolts are used as fastening members for integrally connecting the armature core blocks to the armature attachment plate.

As illustrated in FIG. 3A, when magnetic bolts 111 are used, leakage flux is generated and thrust decreases. As illustrated in FIG. 3B, when non-magnetic bolts 112 are used, generation of leakage flux is prevented and reduction in thrust is prevented.

Third Embodiment

FIG. 4 is a sectional plan view of an armature core block according to a third embodiment of the present invention.

The third embodiment illustrated in FIG. 4 is different from the first and second embodiments in that the attachment holes 9 formed in the step portion 10 of the armature core block 4 have an oblong shape.

With such a structure, when fastening the armature core block 4 to the armature attachment plate, the armature core block 4 can be moved in a direction perpendicular to the longitudinal direction of the armature core block 4 (indicated by an arrow A in FIG. 4), so that the attachment position of the armature core block 4 can be flexibly adjusted. As a result, cogging thrust can be reduced by optimally positioning the armature core block with respect to the armature attachment plate.

In the linear motor of the comparative example, the armature core block is fixed to the armature attachment plate using only one bolt disposed at the center of the armature core block. Therefore, when attaching the armature core block to the armature attachment plate, the armature core block may rotate around the center of the core, so that the distances between adjacent armature core blocks may become irregular and hence cogging thrust may be generated. In contrast, in the linear motor according to the third embodiment, the armature core block is fixed at two positions in the step portion, so that the armature core block does not rotate around the center of the core, whereby the attachment position can be accurately fixed and generation of cogging thrust due to variation in production can be reduced.

As heretofore described, in the first to third embodiments, the attachment hole in the linear motor armature is formed in the armature core block at positions different from the center of the armature core block so as not to interrupt the path of magnetic flux. Therefore, magnetic flux straightly passes through the armature core block along a wide path, whereby a large amount of magnetic flux can pass through the armature core block. As a result, the thrust and torque of the linear motor are increased by using the linear motor armature, and the linear motor can be used for a wide range of motors. The embodiments have a great effect when applied not only to an armature core block made of non-oriented electromagnetic steel sheets but also to an armature core block made of oriented electromagnetic steel sheets.

What is claimed is:

1. A linear motor armature comprising:
a plurality of armature core blocks that are linearly connected to each other, each armature core block being formed of a stack of a plurality of armature cores that are substantially I-shaped, each armature core block including teeth portions around which armature coils are wound, the teeth portions being provided in two end portions of the armature core block in a longitudinal direction of the armature core block, and a step portion extending in a direction perpendicular to the longitudinal direction of the armature core block, the step portion being provided at a center of the armature core block and having a width larger than a width of the teeth portions,
wherein an attachment hole for fixing each of the plurality of armature core blocks to an external armature attachment plate is formed in each of two side portions of the step portion.

2. The linear motor armature according to claim 1,
wherein fastening members are inserted into the attachment holes in the armature core blocks, and the armature core blocks and the armature attachment plate are integrally connected to each other.

3. The linear motor armature according to claim 2,
wherein non-magnetic bolts are used as the fastening members.

4. The linear motor armature according to claim 2,
wherein the attachment holes have an oblong shape, and the armature core blocks and the armature attachment plate are integrally connected to each other with the fastening members.

5. A linear motor comprising:
an armature including a plurality of armature core blocks that are linearly connected to each other, each armature core block being formed of a stack of a plurality of armature cores that are substantially I-shaped, each armature core block including teeth portions around which armature coils are wound, the teeth portions being provided in two end portions of the armature core block in a longitudinal direction of the armature core block, and a step portion extending in a direction perpendicular to the longitudinal direction of the armature core block, the step portion being provided at a center of the armature core block and having a width larger than a width of the teeth portions, wherein an attachment hole for fixing each of the plurality of armature core blocks to an external armature attachment plate is formed in each of two side portions of the step portion; and
a field magnet disposed so as to face the armature with a magnetic gap therebetween, the field magnet including a plurality of permanent magnets arranged adjacent to each other on a field magnet yoke, the plurality of permanent magnets having alternate polarities,
wherein one of the armature and the field magnet serves as a stator and the other of the armature and the field magnet serves a mover that is movable with respect to the stator.

* * * * *